US006807983B1

(12) United States Patent
Erickson

(10) Patent No.: US 6,807,983 B1
(45) Date of Patent: Oct. 26, 2004

(54) VALVE ASSEMBLY WITH SWIVEL ESCUTCHEON

(75) Inventor: Perry D. Erickson, Sheboygan, WI (US)

(73) Assignee: Kohler Co., Kohler, WI (US)

(*) Notice: Subject to any disclaimer, the term of this patent is extended or adjusted under 35 U.S.C. 154(b) by 0 days.

(21) Appl. No.: 10/430,659

(22) Filed: May 6, 2003

(51) Int. Cl.⁷ ................................................. F16L 5/00
(52) U.S. Cl. ................ 137/359; 137/15.01; 137/315.01
(58) Field of Search ............................ 137/359, 15.01, 137/315.01

(56) References Cited

U.S. PATENT DOCUMENTS

| | | | | |
|---|---|---|---|---|
| 572,911 A | * | 12/1896 | Schmidt ........................ 285/46 |
| 1,163,457 A | * | 12/1915 | Regar ........................... 285/46 |
| 1,436,667 A | * | 11/1922 | Mueller ........................ 137/359 |
| 2,896,222 A | * | 7/1959 | Freibott ......................... 4/675 |
| 3,067,436 A | * | 12/1962 | Freibott ......................... 4/675 |
| 3,448,755 A | * | 6/1969 | Symmons ..................... 137/100 |
| 3,960,016 A | * | 6/1976 | Symmons ..................... 374/148 |
| 5,467,799 A | | 11/1995 | Buccicone et al. |
| 6,419,276 B1 | * | 7/2002 | Gatter et al. .................... 285/46 |

* cited by examiner

Primary Examiner—A. Michael Chambers
(74) Attorney, Agent, or Firm—Quarles & Brady LLP

(57) ABSTRACT

A fluid control valve includes a swivel joint for pivotally mounting a decorative escutcheon relative to a valve body so that the escutcheon can mount flush against the mounting wall when the wall or the valve is out of plumb. There is a valve housing from which extends a rotatable valve stem, an escutcheon mountable around the housing or stem, a swivelable bearing also disposed about the housing or stem, and a skirt mounted around the stem. Tightening the skirt drives its inner edge against the bearing which in turn abuts the escutcheon. The escutcheon can pivot relative to the bearing due to abutting curved surfaces on the escutcheon and bearing.

6 Claims, 5 Drawing Sheets

US 6,807,983 B1

VALVE ASSEMBLY WITH SWIVEL ESCUTCHEON

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to fluid control valves, and in particular to valve assemblies designed for use in what may be out of plumb mounting locations.

Tub/shower fluid control valves are typically mounted through a wall surrounding a tub or a shower stall. The wall may be part of a unitary enclosure, or it may be a room wall such as a tiled wall forming part of a shower enclosure.

Such control valves are typically anchored to rear studs and/or adjacent wall board, and then linked to hot and cold water supply lines behind the wall. These valves usually have a valve stem that projects outward from a wall opening, and a handle is attached to the outer end of the stem to provide control over the valve from the room side of the wall.

Many of these valves are mixer valves which accept both hot and cold water, control the proportioning and volume of water there through, and deliver a mixed outlet stream to a tub filler, shower head and/or the like when the valve is turned on. See e.g. U.S. Pat. No. 5,467,799. Other such valves merely control the volume of a single supply of cold or hot water.

In any event, such valves are preferably mounted in a manner where a valve stem protrudes at a 90 degree angle from the wall. This facilitates the alignment of a decorative escutcheon that abuts against the walls outside to hide the wall opening as well as prevent air leakage through the wall opening.

Occasionally in new installations, and much more often in connection with remodeling projects, the walls of the enclosure are not perfectly plumb (vertical). Alternatively, even where they are plumb, the control valve may have been installed so that the valve stem does not extend through the wall exactly horizontally. In either case, this will cause the angle between the valve stem and the wall to be more or less than 90 degrees, which presents a problem for mounting the escutcheon.

For example, if the escutcheon is secured tightly on the valve perpendicular to the valve stem, its back/inner side will not be flush against the wall. Instead, there will be a gap between the wall and the escutcheon. This gap may be unsightly, and in any event will leave an opening through which cold drafts can enter the bathroom and room moisture can leak from the room behind the room walls (possibly leading to mildew that is difficult to remove).

In the past, one approach for dealing with this problem, when the degree off plumb was small, was to slightly bend the escutcheon or gouge out the wall slightly where the escutcheon hit first. For some room materials (e.g. tile) this was difficult. Further, this in any event required additional time and effort and occasionally led to a somewhat unprofessional appearance.

U.S. Pat. No. 572,911 disclosed a fluid control valve that had a pipe section formed with an annular shoulder or bulge defining a curved surface of increased diameter than the pipe section that fit into a curved pocket in an escutcheon. The escutcheon could swivel or pivot around the shoulder to be at a non-perpendicular angle relative to the pipe.

U.S. Pat. No. 1,163,457 disclosed a somewhat similar assembly albeit here the bulge or shoulder was on an annular member (separate from the spigot pipe) and the escutcheon did not appear to have a concave pocket.

The assemblies disclosed in both of these patents left the shoulder and mating surface of the escutcheon visible from inside the room. Also, when the escutcheon was at a non-perpendicular angle on the spigot it overlapped portions of the shoulder differently, making it somewhat evident that the escutcheon was not plumb.

Thus, a need still exists for an improved valve assembly in which the escutcheon can be mounted in a decorative manner, yet flush, against a mounting wall in out of plumb situations.

SUMMARY OF THE INVENTION

The invention provides a fluid valve assembly. There is a valve housing from which extends a movable (preferably rotatable or slidable) valve stem for controlling fluid flow through the fluid valve. There is also an escutcheon mountable around the housing or stem, the escutcheon having an opening between an inner face and an outer face, the escutcheon also having an outer facing socket around the opening where the socket has an outer facing curved surface.

In accordance with the invention a swivelable bearing is disposed about the housing or stem, the bearing having a curved surface abutting the curved surface of the outer facing socket. A skirt is mounted around the stem and has an outer end with an opening therein and an inner end which abuts an outer face of the bearing. There is also a handle linked to the valve stem through the skirt opening.

If the assembly is mounted such that the stem does not extend at an exactly 90 degree angle relative to a room wall adjacent thereto, the escutcheon can swivel relative to the bearing as the assembly is installed against the room wall. This permits the escutcheon to lie flat against the room wall, thereby eliminating any gaps between the rear of the escutcheon and the wall.

In preferred embodiments the bearing is prevented from rotation around a longitudinal axis of the stem by the valve housing having a recess in which is disposed a radial projection of the bearing to restrict relative rotation there between. Also, the escutcheon is prevented from rotating along that longitudinal axis of the stem relative to the bearing by the bearing having a recess in which is disposed a radial tab of the escutcheon. It should be appreciated that the positions of the recesses and projections can be reversed to achieve a similar result and that the swivel bearing and the escutcheon could be made without the projections and tab so that they are able to turn.

In another preferred form the skirt threads onto the valve housing. Thus, the rotation of the skirt drives the skirt inner end against the bearing.

Thus, the present invention provides an assembly which includes a swivel joint for pivotally mounting an escutcheon to the valve body so that it can mount flush against the mounting wall when the wall or the valve is out of plumb. Of course, the bearing need not be restricted against rotation relative to the escutcheon. In such a case swiveling would mean any tilting motion between the bearing and escutcheon.

The assembly thus offers a quick and easy way to achieve a clean, professional look when installing fluid valves. This eliminates gaps or spaces between the escutcheon and the wall (without the need for bending the escutcheon, gouging the wall or inserting fillers). The concept would also work on control valves mounted on horizontal support surfaces (e.g. on a tub mounting rim). In such a case the term "outer" would mean "upper", and the term "inner" would mean "lower".

Moreover, even where the construction is perfectly plumb the assembly can be used. Another advantage is that the swivel joint is largely concealed when the assembly is fully assembled, so that there is little or no visual indication that the installation is out of plumb.

These and still other advantages of the invention will be apparent from the detailed description and drawings. While a particular preferred embodiment has been disclosed hereafter, it should be recognized that the invention is not so limited. Rather, the claims should be looked to in order to judge the full scope of the invention.

DETAILED DESCRIPTION OF THE PREFERRED EMBODIMENT

Figure 1:
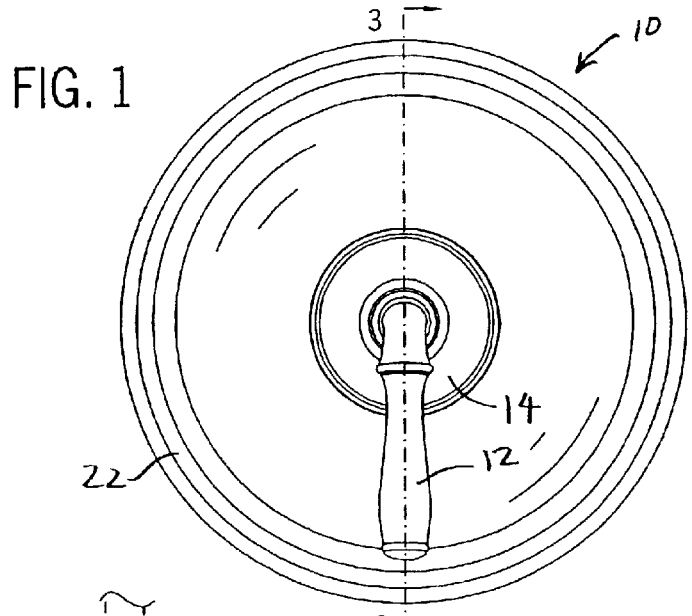
FIG. 1 is a front view of a fluid control valve assembly of the present invention as it would be positioned for mounting on a vertical wall.
Figure 3:
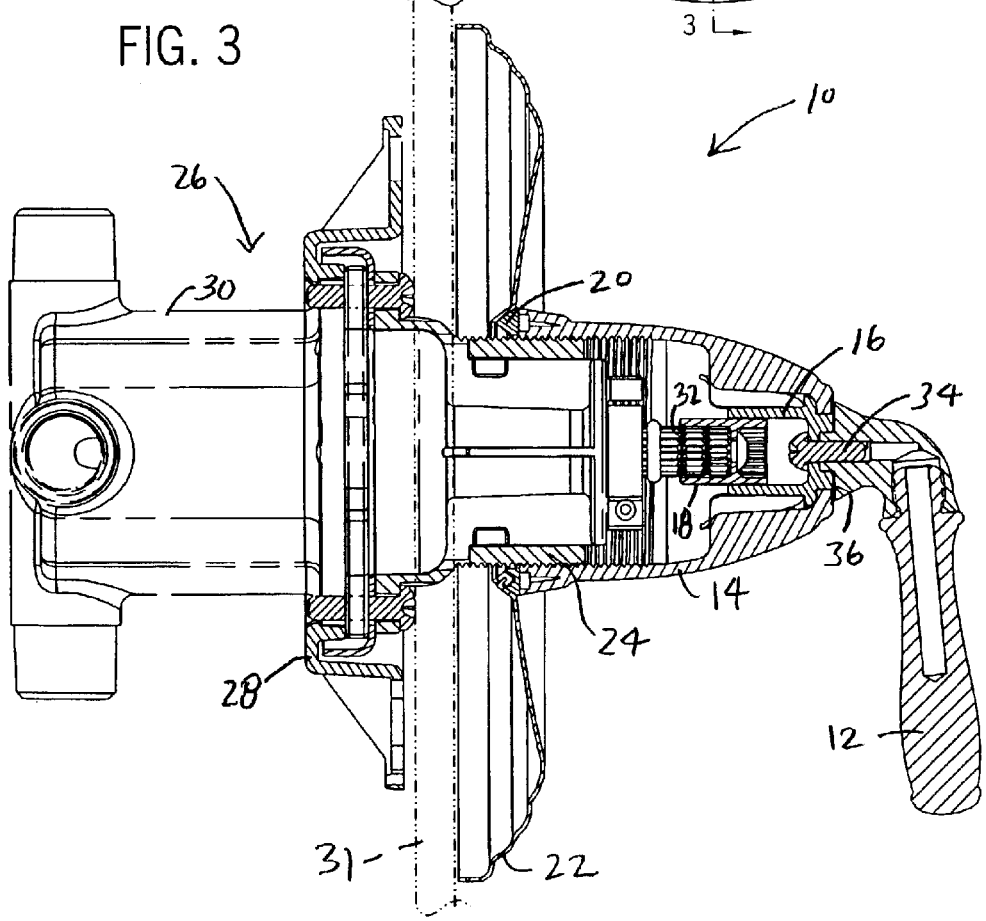
FIG. 3 is a cross-sectional view taken along line 3—3 of FIG. 1.
Figure 2:
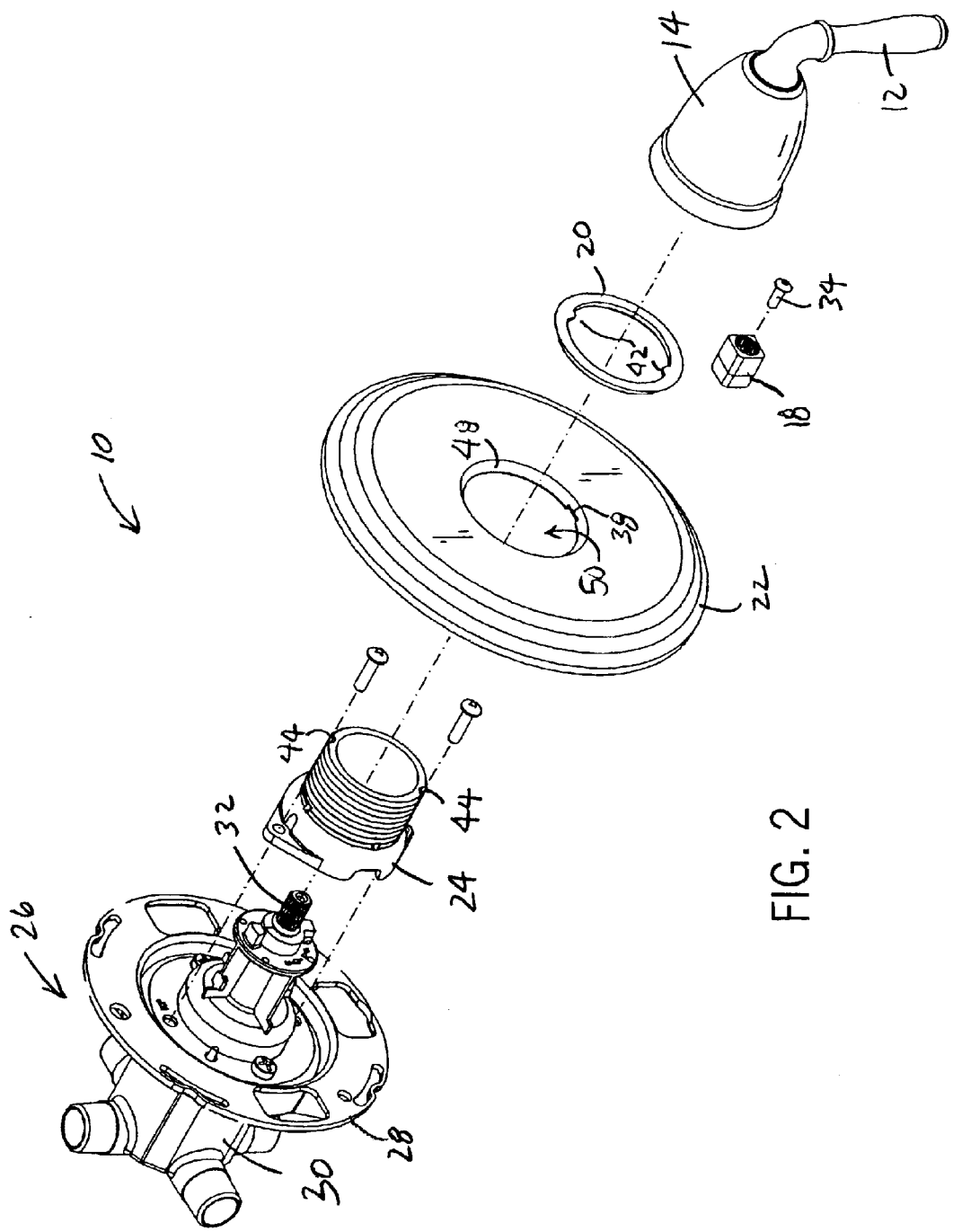
FIG. 2 is an exploded perspective view thereof.

Referring to FIGS. 1–3, a valve assembly 10 of the present invention includes a handle 12, a skirt 14, a stem driver 16, a length adapter 18, a swivel bearing 20, a decorative escutcheon 22, a first housing part 24 and a second housing part 26. One possible valve mechanism to be used inside the housing parts is that described in U.S. Pat. No. 5,467,799, the disclosure of which is hereby incorporated by reference as if fully set forth herein.

The second housing part 26 can include a separate valve cap 28 that bolts onto a body part 30 and permits a mounting of the body 30 to a rear of a room wall 31 (shown in phantom in FIG. 3). The usual hot and cold water supply lines can be coupled to the body 30. The first housing part bolts to the valve cap 28 and a valve stem 32 from the body 30 extends into the room. The skirt 14 threads onto the first housing part 24 and shrouds the valve stem 32 and its connection to the handle 12. Once the skirt 14 is fully threaded onto the first housing part 24, it no longer rotates in the direction of tightening.

Referring to FIG. 3, the handle 12 is coupled to the valve stem 32 via a coupling of the stem driver 16 to the handle 12, a coupling of the stem driver 16 with the length adjusting adapter 18, and a coupling of the length adjusting adapter to the valve stem 32. In particular, the handle 12 fits over an opening in an outer end of the skirt 14.

The stem driver 16 is fixed to the handle 12 to rotate therewith by an axial bolt 34 extending outward through the opening in the skirt 14. The stem driver 16 has a shoulder at an outer end that is larger than the opening in the skirt 14 so that the skirt 14 is captured between the handle 12 and the stem driver 16 while both can rotate relative to the skirt 14. The stem driver 16 has a squared inward socket slidably receiving the outer walls of the adapter 18.

The adapter 18 has internal splines that engage splines on the valve stem 32 to permit no relative rotation there between, and the skirt 14 (by virtue of being anchored to the first housing part 24) holds the driver 16, and thus the adapter 18, axially in place on the valve stem 32. A washer 36 can be inserted between the handle 12 and the skirt 14 to ease rotation of the handle 12, if desired. Alternatively, a lubricant can be provided at this position, and/or the materials can be selected to permit sliding contact.

Rotating the handle 12 thus operates the valve stem 32 to adjust the flow rate and temperature of the water through the second housing part in a conventional manner. The second housing part 26 can have a fixed rotational stop member (not shown) extending parallel with the valve stem 32 that cooperates with another member (not shown) on the valve stem 32 to limit the arc of rotation of the valve stem 32 and thus provide a maximum hot temperature.

With particular focus on key features of the invention, we next note that the swivel bearing 20 and the escutcheon 22 fit onto and around the first housing part 24. Alternatively, they could extend around the stem 32. In either case, the inner end of the skirt 14 presses against the flat front face of the swivel bearing 20, which in turn is in abutment with the escutcheon 22. The escutcheon 22 is in turn in contact with the room wall.

Being between the escutcheon 22 and the skirt 14, the swivel bearing 20 (and thus the swivel joint) is nearly entirely hidden. The escutcheon 22 is large enough to conceal the wall hole, as well as any attachments between the valve cap 28 and the wall.

In one preferred form the escutcheon 22 has a tab 38 at its inner diameter that mates with a notch or recess 40 in the swivel bearing 20. This essentially prevents relative rotation there between while permitting the bearing to swivel relative to the escutcheon because the recess 40 is somewhat larger than the tab 38.

The swivel bearing 20 also preferably has two anti-rotation projections 42 (extending radially inward and spaced apart 180 degrees). The swivel bearing projections 42 fit into two axial channels 44 in the first housing part 24 to keep the swivel bearing 20 from rotating relative thereto, such that the escutcheon 22 (via tab 38 and recess 40) will not turn around the longitudinal axis of the valve stem 22. With the swivel bearing 20 properly oriented, the tab 38 both anti-rotates the escutcheon 22 and orients it so that graphics and/or text on the escutcheon 22 are easily readable (e.g. the word "hot", the word "cold" and an arrow there between to suggest a rotary direction).

Figure 4:
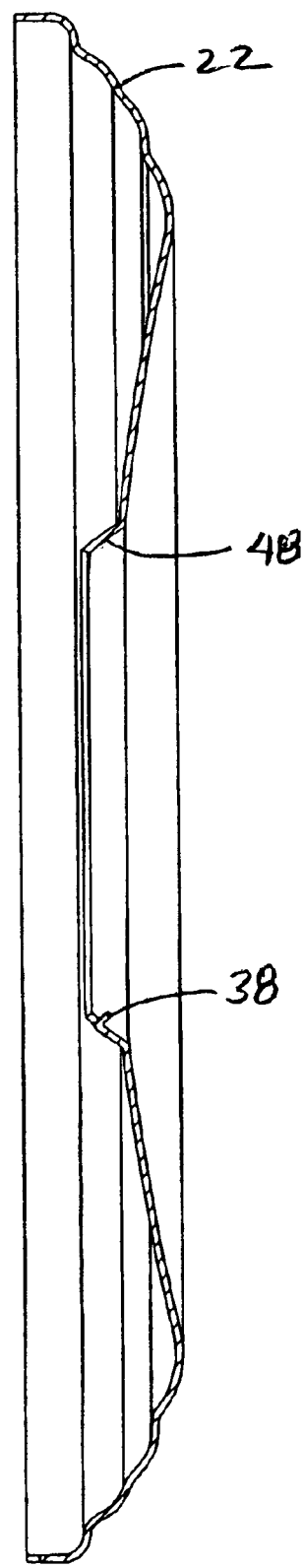
FIG. 4 is an enlarged vertical sectional view of the FIG. 3 escutcheon alone.
Figure 5:
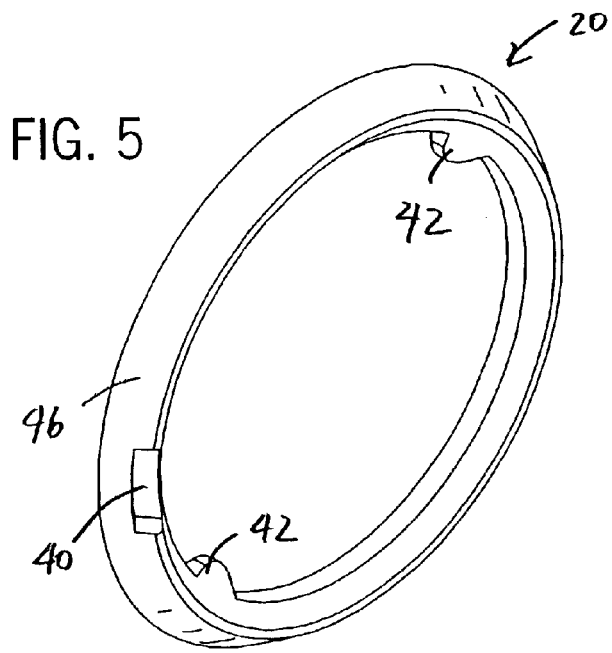
FIG. 5 is an enlarged perspective view of the swivel bearing alone.
Figure 7:
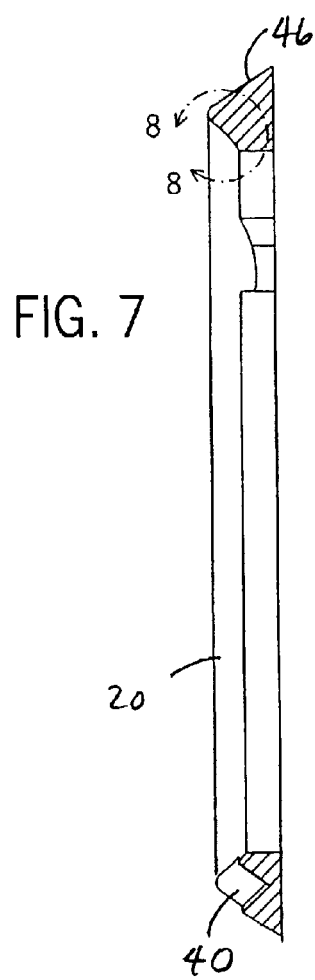
FIG. 7 is a cross-sectional view of the swivel bearing taken along line 7—7 of FIG. 6.
Figure 6:
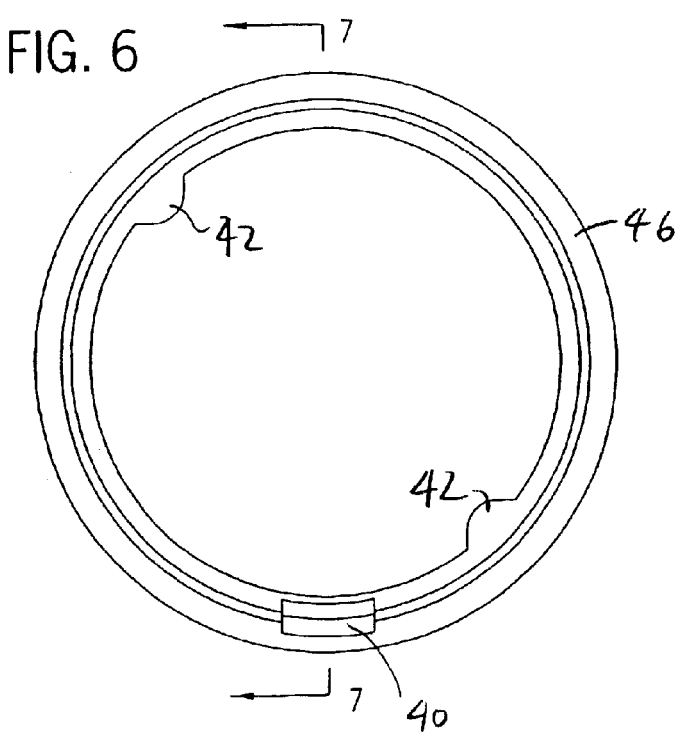
FIG. 6 is a front elevational view thereof.
Figure 8:
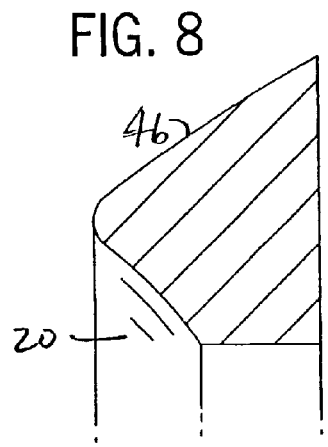
FIG. 8 is a further enlarged sectional view taken along arc 8—8 of FIG. 7.

Referring next to FIGS. 4 and 7–8, the back side of the swivel bearing 20 has a curved, preferably convex, most preferably spherical, peripheral surface 46 which fits into a socket 48 surrounding the circular central opening 50 of the escutcheon 22. The opening 50 extends between opposed inner and outer faces of the escutcheon.

Figure 9:
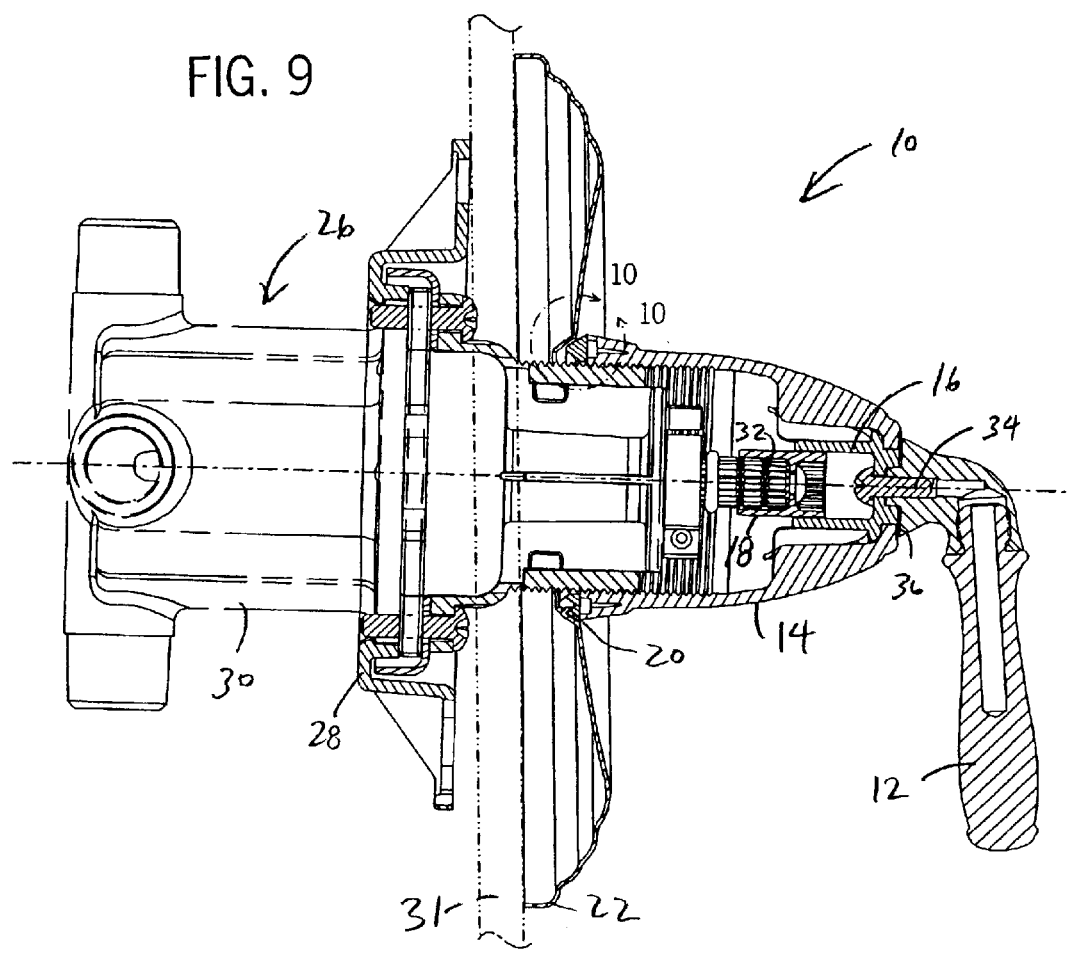
FIG. 9 is a cross-sectional view similar to FIG. 3, albeit showing that valve mounted through a room wall that is out of plumb relative to the valve.
Figure 10:
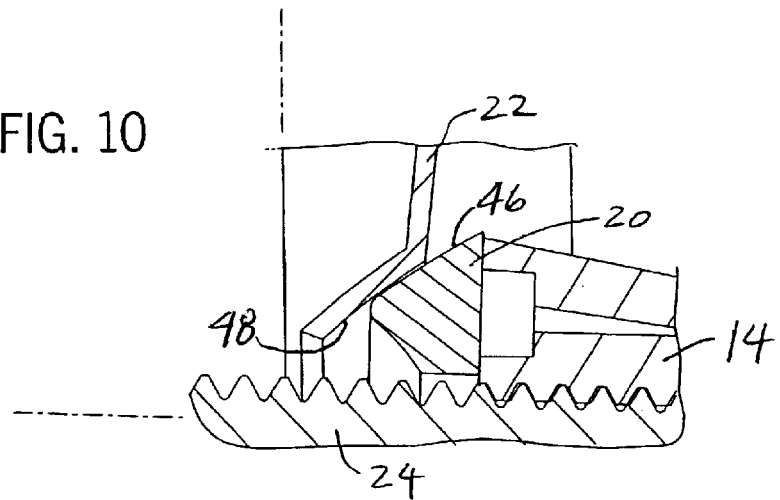
FIG. 10 is a further enlarged section view taken along arc 10—10 of FIG. 9.

The socket 48 has a curved, preferably concave, most preferably spherical, surface which mates with the surface 46 of the swivel bearing 20 to allow the escutcheon 22 to swivel/tilt/pivot with respect to the valve housing and valve stem, much as a ball and socket joint would allow, as shown in FIGS. 9 and 10. Thus, as the skirt 14 is threaded onto the first housing part 24, the escutcheon 22 is able to pivot or tilt somewhat if necessary so that its back side can lie flush against the wall.

This may be needed when the angle between the valve stem 32 is more or less than 90 degrees from the adjacent surrounding wall, as when the plumbing or wall is not perfectly plumb. For instance, in a remodeling project it is common to find the valve stem installed at somewhat different than a 90 degree angle relative to the surrounding wall due to improper initial installation or shifts in the wall or valve over time.

Preferably, the swivel adjustment to the escutcheon 22 will occur on its own as the skirt 14 is tightened onto the first housing part 24. Alternatively, the escutcheon can be manually tilted to facilitate removal of any remaining gap.

More specifically, with the escutcheon 22 slipped onto the first housing part 24 and the swivel bearing 20 slid thereon with its projections 42 in the channels 44 of the first housing part 24, the skirt 14 is threaded onto the first housing part 24 until it abuts the swivel bearing 20. Thereafter, it pushes the swivel bearing 20 into the socket 48 of the escutcheon 22 (if not already there), which in turn causes the swivel bearing 20 to push the escutcheon 22 back against the wall. If the wall is not exactly 90 degrees relative to the valve stem 32, a portion of the escutcheon 22 will abut the wall before the rest of the escutcheon 22 and stop, after which the escutcheon 22 will pivot about the swivel bearing 20 as the skirt 14 is tightened further, until the entire back side of the escutcheon 22 is flush against the wall.

Thus, the present invention provides an assembly, particularly designed for a tub/shower control valve, which includes a swivel joint for pivotally mounting an escutcheon to the valve body first housing part so that it can mount flush against the mounting wall when it or the valve is out of plumb. The assembly offers a quick and easy way to achieve a clean, professional look with no gaps or spaces between the escutcheon and the wall (without needing to bend the escutcheon, gouge the wall or insert fillers).

A preferred embodiment of the invention has been described above. However, from the disclosure contained herein, modifications and variations to the preferred embodiment will be apparent to those skilled in the art, which will be within the spirit and scope of the invention. Therefore, the invention should not be limited to just the described embodiment. To ascertain the full scope of the invention, the following claims should be referenced.

INDUSTRIAL APPLICABILITY

The invention provides a fluid control valve assembly particularly suited to adjust for out of plumb conditions.

What is claimed is:

1. A fluid valve assembly, comprising:
   a valve housing from which extends a movable valve stem for controlling fluid flow through the fluid valve;
   an escutcheon mountable around the housing or stem, the escutcheon having an opening between an inner face and an outer face, the escutcheon also having an outer facing socket around the opening where the socket has an outer facing curved surface;
   a swivelable bearing disposed about the housing or stem, the bearing having a curved surface abutting the curved surface of the outer facing socket;
   a skirt mounted around the stem and having an outer end with an opening therein and an inner end which abuts an outer face of the bearing; and
   a handle linked to the valve stem through the skirt opening;
   whereby if the assembly is mounted such that the stem does not extend at an exactly 90 degree angle relative to a room wall adjacent thereto, the escutcheon can swivel relative to the bearing as the assembly is installed against the room wall.

2. The assembly of claim 1, wherein the bearing is prevented from rotation around a longitudinal axis of the stem.

3. The assembly of claim 2, wherein the valve housing has a recess in which is disposed a radial projection of the bearing to restrict relative rotation there between.

4. The assembly of claim 2, wherein the escutcheon is prevented from rotating along a longitudinal axis of the stem relative to the bearing.

5. The assembly of claim 4, wherein the bearing has a recess in which is disposed a radial tab of the escutcheon.

6. The assembly of claim 1, wherein the skirt threads onto the valve housing.

* * * * *